(12) United States Patent
Fu

(10) Patent No.: US 7,813,510 B2
(45) Date of Patent: Oct. 12, 2010

(54) KEY MANAGEMENT FOR GROUP COMMUNICATIONS

(75) Inventor: Judy Fu, Lake Zurich, IL (US)

(73) Assignee: Motorola, Inc, Schaumburg, IL (US)

( * ) Notice: Subject to any disclaimer, the term of this patent is extended or adjusted under 35 U.S.C. 154(b) by 1449 days.

(21) Appl. No.: 11/068,009

(22) Filed: Feb. 28, 2005

(65) Prior Publication Data
US 2006/0193473 A1 Aug. 31, 2006

(51) Int. Cl.
H04L 9/08 (2006.01)

(52) U.S. Cl. .................. 380/279; 380/44; 713/163

(58) Field of Classification Search .......... 380/277, 380/278, 279, 44, 45; 713/163
See application file for complete search history.

(56) References Cited

U.S. PATENT DOCUMENTS

| | | | | |
|---|---|---|---|---|
| 4,941,176 A * | 7/1990 | Matyas et al. | ........... | 380/280 |
| 6,026,167 A * | 2/2000 | Aziz | ........... | 380/28 |
| 6,049,878 A | 4/2000 | Caronni et al. | | |
| 6,052,466 A * | 4/2000 | Wright | ........... | 380/262 |
| 6,240,188 B1 * | 5/2001 | Dondeti et al. | ........... | 380/284 |
| 6,263,435 B1 * | 7/2001 | Dondeti et al. | ........... | 713/163 |
| 6,275,859 B1 * | 8/2001 | Wesley et al. | ........... | 709/229 |
| 6,330,671 B1 * | 12/2001 | Aziz | ........... | 713/163 |
| 6,359,986 B1 * | 3/2002 | Tatebayashi | ........... | 380/277 |
| 6,389,136 B1 * | 5/2002 | Young et al. | ........... | 380/28 |
| 6,526,054 B1 * | 2/2003 | Li et al. | ........... | 370/390 |
| 6,584,566 B1 * | 6/2003 | Hardjono | ........... | 713/163 |
| 6,611,872 B1 * | 8/2003 | McCanne | ........... | 709/238 |
| 6,636,895 B1 * | 10/2003 | Li et al. | ........... | 709/238 |
| 6,684,331 B1 * | 1/2004 | Srivastava | ........... | 713/163 |
| 6,707,796 B1 * | 3/2004 | Li | ........... | 370/254 |
| 6,785,809 B1 * | 8/2004 | Hardjono | ........... | 713/163 |
| 6,813,714 B1 * | 11/2004 | Hardjono et al. | ........... | 726/14 |
| 6,823,070 B1 * | 11/2004 | Smith et al. | ........... | 380/286 |
| 6,901,510 B1 * | 5/2005 | Srivastava | ........... | 713/163 |
| 6,912,654 B2 * | 6/2005 | Murakami | ........... | 713/155 |
| 6,987,855 B1 * | 1/2006 | Srivastava | ........... | 380/278 |
| 6,996,724 B2 * | 2/2006 | Murakami et al. | ........... | 713/193 |
| 7,003,677 B1 * | 2/2006 | Herzberg et al. | ........... | 713/180 |
| 7,013,389 B1 * | 3/2006 | Srivastava et al. | ........... | 713/163 |
| 7,043,024 B1 * | 5/2006 | Dinsmore et al. | ........... | 380/278 |
| 7,055,030 B2 * | 5/2006 | Negawa | ........... | 713/163 |
| 7,065,643 B1 * | 6/2006 | Cornils et al. | ........... | 713/163 |
| 7,076,654 B2 * | 7/2006 | Kawamoto | ........... | 713/163 |
| 7,080,157 B2 * | 7/2006 | McCanne | ........... | 709/238 |
| 7,080,255 B1 * | 7/2006 | Kasahara et al. | ........... | 713/182 |
| 7,089,211 B1 * | 8/2006 | Trostle et al. | ........... | 705/51 |

(Continued)

OTHER PUBLICATIONS

Baugher, et al., Group Key Management Architecture, Internet Draft, Feb. 28, 2002, pp. 1-29.

(Continued)

*Primary Examiner*—David Garcia Cervetti

(57) ABSTRACT

A system for key management for a plurality of nodes includes: a first key generation device (130) for generating a first set of secret keys for secure communication between the plurality of nodes; a second key generation device (130) for generating a second set of secret keys that is different from the first set of secret keys for secure communication between the plurality of nodes; and key distribution apparatus (140) coupled to the first and second key generation devices for authenticating the plurality of nodes and selectively distributing the first and second sets of secret keys to the plurality of nodes.

14 Claims, 3 Drawing Sheets

U.S. PATENT DOCUMENTS

| | | | |
|---|---|---|---|
| 7,096,356 B1* | 8/2006 | Chen et al. | 713/163 |
| 7,127,067 B1* | 10/2006 | Wachtler et al. | 380/255 |
| 7,127,610 B1* | 10/2006 | Li et al. | 713/163 |
| 7,133,928 B2* | 11/2006 | McCanne | 709/238 |
| 7,191,155 B2* | 3/2007 | Maruyama et al. | 705/59 |
| 7,222,234 B2* | 5/2007 | Martin et al. | 713/163 |
| 7,224,804 B2* | 5/2007 | Ishiguro et al. | 380/279 |
| 7,231,521 B2* | 6/2007 | Buddhikot et al. | 713/171 |
| 7,260,716 B1* | 8/2007 | Srivastava | 713/163 |
| 7,263,611 B2* | 8/2007 | Itkis | 713/163 |
| 7,269,257 B2* | 9/2007 | Kitaya et al. | 380/45 |
| 7,290,135 B2* | 10/2007 | Fries et al. | 713/163 |
| 7,296,147 B2* | 11/2007 | Matsuzaki et al. | 713/155 |
| 7,328,343 B2* | 2/2008 | Caronni | 713/171 |
| 7,334,125 B1* | 2/2008 | Pellacuru | 713/163 |
| 7,336,791 B2* | 2/2008 | Ishiguro | 380/278 |
| 7,346,170 B2* | 3/2008 | Asano et al. | 380/278 |
| 7,360,084 B1* | 4/2008 | Hardjono | 713/163 |
| 7,379,550 B2* | 5/2008 | Merzenich | 380/282 |
| 7,382,884 B2* | 6/2008 | Itkis | 380/286 |
| 7,383,436 B2* | 6/2008 | Srivastava et al. | 713/163 |
| 7,471,790 B2* | 12/2008 | Yoshida et al. | 380/28 |
| 7,477,748 B2* | 1/2009 | Schmidt | 380/279 |
| 7,502,927 B2* | 3/2009 | Trostle et al. | 713/163 |
| 7,505,599 B2* | 3/2009 | Ishiguro et al. | 380/278 |
| 7,565,539 B2* | 7/2009 | Agarwal | 713/171 |
| 7,581,100 B2* | 8/2009 | Mizrah | 713/171 |
| 7,590,843 B1* | 9/2009 | Khalil et al. | 713/171 |
| 7,660,419 B1* | 2/2010 | Ho | 380/270 |
| 7,715,556 B2* | 5/2010 | Chang et al. | 380/44 |
| 2001/0010721 A1* | 8/2001 | Murakami | 380/260 |
| 2001/0010724 A1* | 8/2001 | Murakami | 380/286 |
| 2001/0023487 A1* | 9/2001 | Kawamoto | 713/202 |
| 2002/0150097 A1* | 10/2002 | Yen et al. | 370/390 |
| 2002/0154782 A1* | 10/2002 | Chow et al. | 380/278 |
| 2003/0046539 A1* | 3/2003 | Negawa | 713/163 |
| 2003/0059054 A1* | 3/2003 | Hu et al. | 380/277 |
| 2003/0088696 A1* | 5/2003 | McCanne | 709/238 |
| 2003/0133576 A1* | 7/2003 | Grumiaux | 380/279 |
| 2003/0233573 A1* | 12/2003 | Phinney | 713/200 |
| 2004/0010616 A1* | 1/2004 | McCanne | 709/238 |
| 2004/0073801 A1* | 4/2004 | Kalogridis et al. | 713/176 |
| 2004/0114762 A1* | 6/2004 | Medvinsky | 380/277 |
| 2005/0111668 A1* | 5/2005 | Raikar | 380/278 |
| 2005/0125684 A1* | 6/2005 | Schmidt | 713/200 |
| 2005/0154883 A1* | 7/2005 | Itkis | 713/163 |
| 2005/0213765 A1* | 9/2005 | Mihaljevic et al. | 380/277 |
| 2006/0009247 A1* | 1/2006 | Kelley et al. | 455/515 |
| 2006/0031936 A1* | 2/2006 | Nelson et al. | 726/23 |
| 2006/0062384 A1* | 3/2006 | Dondeti | 380/44 |
| 2006/0140411 A1* | 6/2006 | Zhu | 380/277 |
| 2006/0168446 A1* | 7/2006 | Ahonen et al. | 713/163 |

OTHER PUBLICATIONS

Harney, et al., RFC 2094—Group Key Management Protocol (GKMP) Architecture, Internet RFC/STD/FYI/BCP Archives, Jul. 1997, pp. 1-17.

Dondeti, et al., Scalable Secure One-to-Many Group Communication Using Dual Encryption.

Mittra, Iolus: A Framework for Scalable Secure Multicasting, Computer Science Department, Stanford University, Proceedings of the ACM SIGCOMM, Sep. 1997, Cannes, France, pp. 1-12.

Poovendran, et al., Technical Research Report, A Scalable Extension of Group Key Management Protocol, The Center for Satellite and Hybrid communication Networks, University of Maryland, pp. 1-5.

Waldvogel, et al., the VersaKey Framework: Versatile Group Key Management, Computer Engineering and Networks Laboratory (TIK) ETH Zurich, Switzerland, pp. 1-27.

O. Rodeh, K. Birman, and D. Dolev. Optimized Group Rekey for Group Communication Systems. Technical Report, Hebrew University, 1999.

C. Boyd. On Key Agreement and Conference Key Agreement. In ACISP: Information Security and Privacy: Australasian Conference, pp. 294-302. Springer-Verlag, 1997.

M. Steiner, G. Tsudik, and M. Waidner. Diffie-Hellman Key Distribution Extended to Group Communication. In SIGSAC: 3rd ACM Conference on Computer and Communica-tions Security, pp. 31-37. ACM SIGSAC, 1996.

M. Steiner, G. Taudik, and M. Waidner. Cliques: A new approach to group key agreement. Technical Report RZ 2984, IBM Research, Dec. 1997.

G. Ateniese, M. Steiner, and G. Tsudik. Authenticated Group Key Agreement and Friends. In Proceedings of the 5th (ACM) Conference on Computer and Communications Security ((CCS)-98), pp. 17-26, New York, 1998. ACM Press.

G. Ateniese, M. Steiner, and G. Tsudik. New Multi-party Authentication Services and Key Agreement Protocols. To appear in IEEE Journal on Selected Areas in Communications, 18(4):628-639, Apr. 2000.

M. Steiner, G. Tsudik, and M. Waidner. Key Agreement in Dynamic Peer Groups. IEEE Transactions on Parallel and Distributed Systems, Mar. 2000.

W. Diffie and M. E. Hellman. New Directions in Cryptography. IEEE Transactions on Information Theory, IT-22(6):644-654, November 76.

C. Becker and U. Wille. Communication Complexity of Group Key Distribution. In 5th ACM Conference on Computer and Communications Security, San Francisco, California, Nov. 1998. ACM Press.

L. Dondeti, S. Mukherjee, and A. Samal. A Dual Encryption Protocol for Scalable Secure Multicasting. Technical Report UNL-CSE-1998-001, University of Nebraska-Lincoln, Lincoln, NE., Jul. 1998.

* cited by examiner

US 7,813,510 B2

KEY MANAGEMENT FOR GROUP COMMUNICATIONS

FIELD OF THE INVENTION

The present invention relates generally to electronic security and more specifically to a method and apparatus for centralized key management for group communications.

BACKGROUND OF THE INVENTION

There are a number of known methodologies to secure group communications, such as multicast group communications, in a communication network. One such methodology is centralized key management, which affords a level of efficiency and cost effectiveness over other methodologies for key management. Typically in a centralized key management approach, an entity called a group controller is used to generate, distribute and update keys for use by a group of nodes in a communication network to affect secure communications between the nodes in the group. A node is defined herein as a point of connection, which may be a redistribution point or an endpoint, in the communication network. In general each node has programmed or engineered capability to recognize, process and/or forward transmissions to and from other nodes.

A primary shortcoming of traditional centralized key management schemes, however, is that they introduce a single point of failure at the group controller. In other words, if the group controller is compromised via a security attack or if the group controller fails, then group communications is compromised. Another shortcoming of centralized key management schemes is the potential for overloading a single group controller as the size of the group increases, especially when the group controller initially distributes keys to the nodes in the group because this is generally much more time consuming and computationally intensive than generating and updating keys. For example, a group controller comprising a 116 MHz computer can generate a new set of keys for 1000 nodes in about 20 ms. However initial key distribution, which includes authenticating each of the 1000 nodes and distributing keys to each node one by one, might take at least eighty seconds (forty seconds for authentication procedures and forty plus seconds for actually distributing the keys to the nodes). This may be extremely undesirable in certain applications, for example in a mission critical application.

One known solution for addressing the above shortcomings is to use two synchronized centralized group controllers. In general, one of the group controllers is the primary group controller in that during the time that it is operational, it is typically solely responsible for generating, distributing and updating the keys. The other group controller is a secondary group controller and would typically only be used where the first group controller becomes inoperable or fails. These two group controllers are synchronized including having a synchronized set of keys, i.e., an identical set, when both are operational, which is generally the set that was generated by the primary group controller.

The above solution addresses fault tolerance in the centralized key management approach in that if the primary group controller fails, the secondary group controller can take over the key management functions since it is synchronized with the primary group controller. However, this solution does not address attack tolerance. Since only one set of keys is being used between the two group controllers, if either of these entities becomes compromised then the entire single set of keys is exposed to attack. The set of keys, thereby, becomes compromised such that an entirely new set of keys would likely have to be generated and distributed to each node in the group. This solution also fails to address the problem of overload of a single group controller because although there are two group controllers implemented in the system, only one of them is performing key management functions (including key distribution) at any given time.

Thus, there exists a need for an improved centralized key management approach that is both attack tolerant and fault tolerant. It is also desirable that this centralized key management approach incorporate load balancing techniques, especially during the relatively time-consuming and computationally intensive key distribution process.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
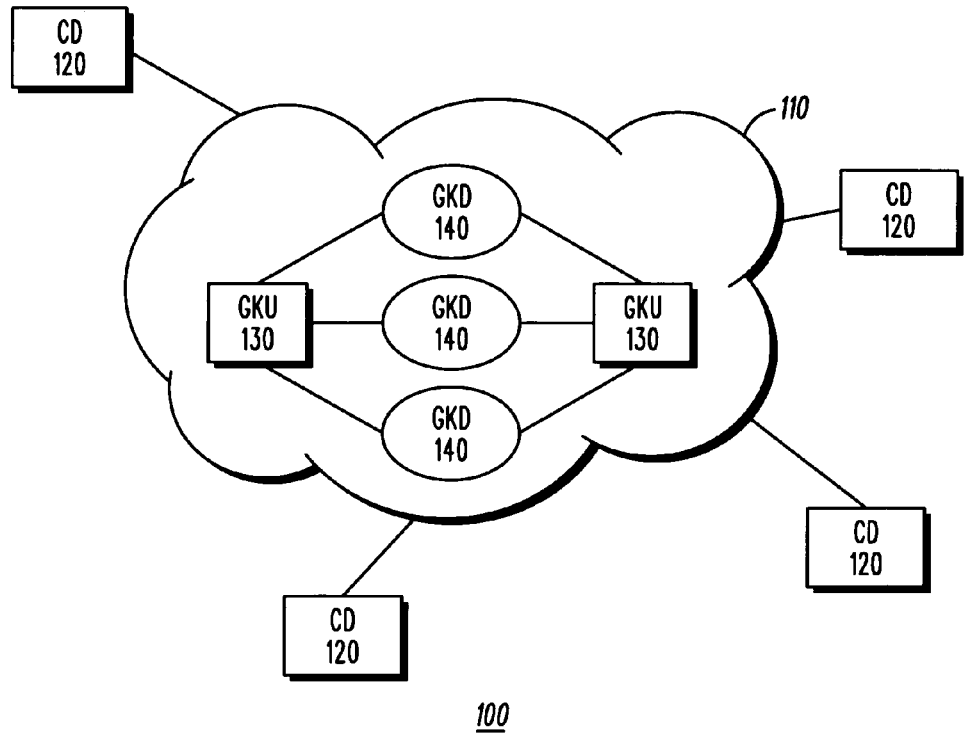
FIG. 1 is a block diagram illustrating a centralized key management system in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking, pursuant to the various embodiments, the present invention illustrates a method and apparatus for centralized key management in a communication system. In one aspect of the present invention there is a system for key management that includes at least two key generation devices that are not synchronized. Each key generation device generates, and updates if necessary, a separate and distinct set of keys that are each sent to a plurality of nodes. One key generation device is ideally the primary key generation device in that during normal operation group communications are typically secured using the set of keys generated and updated by the primary key generation device. All other key generation devices are secondary in that keys generated by a secondary key generation device are used for secure group communications upon the primary key generation device becoming inoperable, disabled, compromised, etc.

The above architectural feature of having at least two key generation devices enables fault tolerance in the system because if the primary key generation device fails, there is at least one other key generation device that can assume the functions of the primary key generation device. The above feature of each key generation device generating separate and distinct sets of keys that are sent to the plurality of nodes enables attack tolerance. This is because if the primary key generation device and its key set become compromised, then secure group communications can continue with a much shorter delay than is possible using known centralized key management approaches by using a set of keys generated by a secondary key generation device, which has already been distributed to the nodes in the group.

In another aspect of the present invention there is key distribution apparatus coupled to the at least two key generation devices that may comprise one or more key distribution devices. The key distribution device(s) authenticate each of the plurality of nodes and also distributes respective keys from the key generation devices to each of the nodes. Ideally, the keys themselves are encrypted prior to being distributed by the key distribution devices so that they are secret from the key distribution devices. The number of key distribution devices may be selected to optimize load balancing in the system during key distribution based on, for instance, the number of nodes in the communication group. The feature of keeping the keys secret from the key distribution devices further enables attack tolerance because if a key distribution device is compromised then it may be removed without compromising the keys. Those skilled in the art will realize that the above recognized advantages and other advantages described herein are merely exemplary and are not meant to be a complete rendering of all of the advantages of the various embodiments of the present invention.

Referring now to the drawings, and in particular FIG. 1, a communication environment is shown and indicated generally at 100. Environment 100 includes four nodes 120 (each interchangeably referred to herein as a communication device or a "CD" as illustrated in FIG. 1). Nodes 120 may be any number of devices such as, for instance, a personal computer, a laptop, a personal data assistant (PDA), a phone, a radio, etc., having the necessary hardware and software for transmitting and receiving information such as voice and data, for example, to and from other nodes 120 in environment 100. In the particular implementation illustrated in FIG. 1, environment 100 includes only four nodes for ease of illustration. However, it should be readily appreciated by those of ordinary skill in the art that environment 100 would typically include many more nodes that may, for instance, form one or more groups for purposes of communicating.

Nodes 120 are connected to and communicate (i.e., transmit and receive) over a network 110. Network 110 may be a wired or wireless network such as, for instance, the Internet, a Wide Area Network (WAN), a Local Area Network (LAN), etc. Moreover, nodes 120 may communicate over network 110 using a protocol such as, for instance, the Internet Protocol (IP) (defined herein as the implementation of IP in accordance with the IETF (Internet Engineering Task Force) Request for Comment 2460, i.e. IPv.6, and any previous or subsequent versions). Thus, those of ordinary skill in the art will realize that depending upon the type of network being used there may be other devices needed to affect communications between the nodes 120 such as, for instance, elements of a communications infrastructure (e.g., base stations), routers, etc. that are not shown in FIG. 1 for ease of illustrating the principles of the present invention.

Under many circumstances, it may be desirable that information transferred between two or more of the nodes 120, i.e., a communications group, be secure so that only those nodes in the group having the proper authorization can read the information. Many forms of electronic security involve cryptography, whereby information is encrypted using a secret key (also referred to herein simply as a "key") and decrypted using the same key (as in symmetric cryptography) or a different key (as in asymmetric cryptography). Thus, only those nodes having the proper keys can decrypt and read information that has been protected using cryptography.

Where cryptography is used to secure information being transmitted in a network, some form of key management system is typically used for managing, i.e., generating, distributing and updating the secret keys used for the secure communications. Environment 100, thus, further includes a key management system in network 110 that ideally comprises at least two key generation devices 130 (also each referred to herein as a group key updater or "GKU") and key distribution apparatus comprising one or more key distribution devices 140 (also each referred to herein as a group key distributor (or "GKD") operatively coupled to the GKU 130. The implementation of the key management system in accordance with an embodiment of the present invention that is illustrated in FIG. 1 includes two GKU and three GKD. However, those skilled in the art will realize that the particular number of GKU and GKD used in any given implementation will depend upon a number of factors including, but not limited to, load balancing in the system and the degree of fault tolerance and attack tolerance needed in the system.

Each GKU 130 comprises a separate physical entity such as, for instance, a server and is configured for performing, in general, key generation and key updating functionality. The two (or more) GKU 130 are not synchronized in that they each generate a separate set of secret keys that may be used for secure communications between nodes 120. Typically one GKU 130 will serve as a primary GKU such that the set of keys that it generates is normally used for secure communications between the nodes. The other GKU 130 will then serve as a secondary GKU in that the set of keys that it generates will be used for secure communications between the nodes only upon the primary GKU becoming, for instance, inoperable or compromised in some way, for example by an attacker of the system.

Having the multiple GKU configured in this fashion enables fault tolerance in that a secondary GKU can perform the key generation and update functionality if the primary GKU fails or becomes compromised. It further facilitates attack tolerance in that the secret keys generated by a secondary GKU can, alternatively, be used for the secure communication between the nodes 120 (without disrupting the communications or with a shorter delay in communications than is possible in the prior art) if the primary GKU becomes compromised. This is because the keys generated by the secondary GKU have typically already be generated and forwarded to the nodes prior to their use becoming necessary.

Ideally, each GKD 140 comprises a separate physical entity such as, for instance, a server and is configured for performing, in general, node authentication and initial key distribution functionality. However, GKD 140 may be physically co-located with any one or more of the GKU 130, for instance, on the same server. Moreover, there is ideally at least one GKD 140 that is not co-located with a GKU 130 so that authentication and key distribution may continue irrespective of the failure of any GKU 130. The GKU and GKD may be coupled wirelessly or using wires that are suitable for a particular implementation, thereby comprising a wired or a wireless key management system. Moreover, the GKU and GKD may be configured with suitable hardware for performing their functionality, e.g., in accordance with the various embodiments of the present invention, or may be configured as a computer having suitable memory apparatus for storing software that comprises this functionality and a suitable processor for executing the software.

Each GKD 140 is configured for performing authentication protocols for authenticating all or a portion of users of the nodes 120 to participate in communications using network 110. For example, the GKD may authenticate users of a given multicast group and forward keys only to authorized members of the group. The particular authentication protocol used is dependent upon the type of communication system and infrastructure in place to affect those communications. For example, the GKD may use a certificate-based authentication to authenticate the members of a multicast group (for instance in public safety applications). In one implementation, the GKD would have a control list that is used to check the certificate of each prospective member to verify that the prospective member is an authorized member to participate in the multicast group. The prospective member may find a GKD in the network using a directory service, for instance, and contact the GKD to request authentication.

Upon authenticating a user of a node 120, the GKD 140 can forward to the user's node 120 one or more keys from the key set generated by the GKU 130, i.e., selectively distributing the key set to a plurality of authenticated nodes. Ideally, the GKU 130 encrypts the secret keys before forwarded them to one or more GKD 140 for distribution to the nodes 120. The keys may be encrypted by the GKU and decrypted by the nodes using another secret key (referred to herein as a PRE_K) that the nodes may be pre-configured with or may be provided with upon successfully completing a suitable registration process, for instance upon registering with a GKU 130 using any suitable means. Any updates to the PRE_K could be performed by a GKU during group communications and forwarded by the GKU to the nodes, for example in a multicast message. Ideally, the GKD would not have access to the PRE_K so that the keys generated by the GKU would be secret to the GKD.

Having a plurality of GKD in the key management system enables load balancing of the more time consuming and computationally intensive functions of authentication and initial key distribution to all of the nodes 120 that are authorized to receive the keys. In general, the number of GKD in the system is based upon the number of nodes in a given communication group. Having the keys encrypted with a PRE_K that is secret to the GKD facilitates attack tolerance because if a GKD is compromised, its functionality may be performed by another GKD or distributed between two or more other GKD without disrupting group communication by, for instance, having to regenerate and redistribute a new set of keys for the secure communications.

Figure 2:
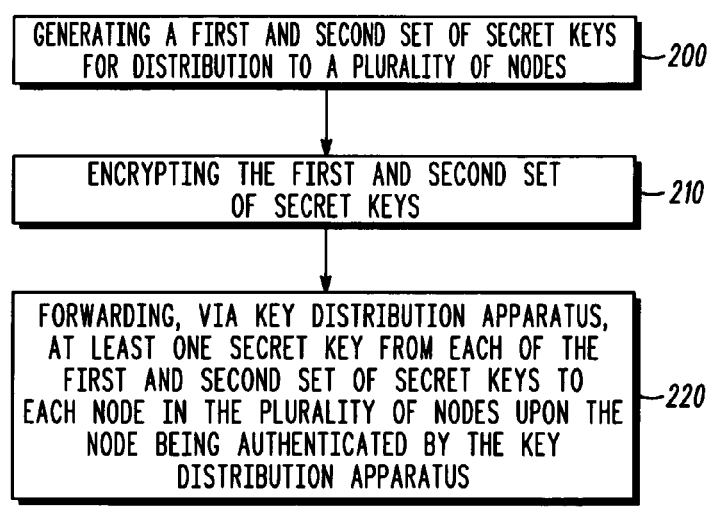
FIG. 2 is a flow diagram illustrating a method for key management in accordance with an embodiment of the present invention.

Turning now to FIG. 2, a flow diagram illustrating a method for key management in accordance with an embodiment of the present invention is shown and generally indicated. The method is generally performed in a plurality of GKU, in this particular example two GKU. The GKU (both the primary and the secondary GKU) generate (200) a set of secret keys for distribution to at least a portion of nodes 120. Each GKU may use any suitable algorithm for generating its set of secret keys. Each GKU then encrypts (210) its set of secret keys using a PRE_K that will be known to the authorized portion of nodes 120. Each GKU forwards (220) at least one encrypted secret key from the set of secret keys, via one or more GKD, to each node that is authorized by the GKD to receive the corresponding encrypted secret key(s) from the set of secret keys.

Figure 3:
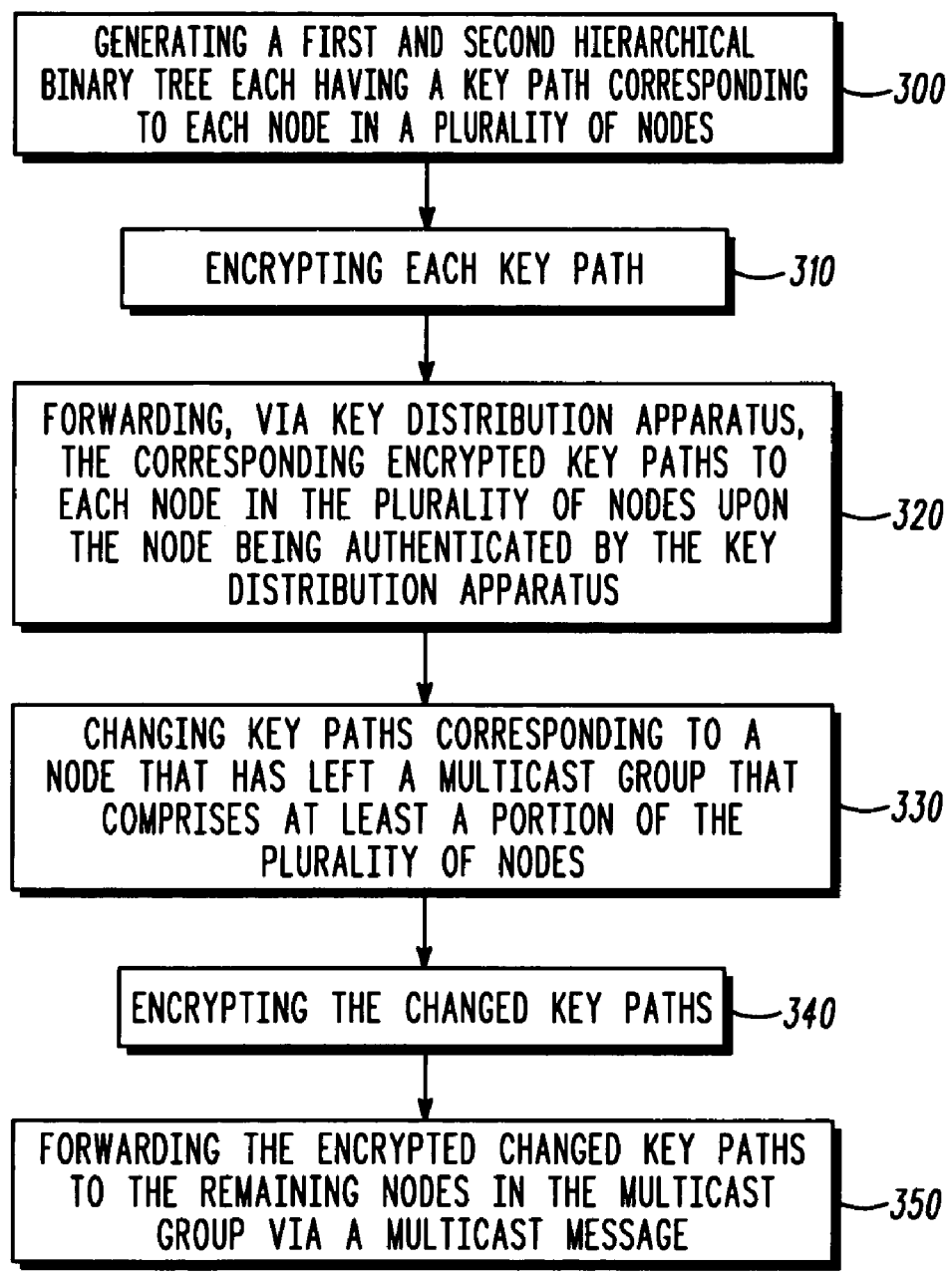
FIG. 3 is a flow diagram of a more detailed method for key management in accordance with an embodiment of the present invention.
Figure 4:
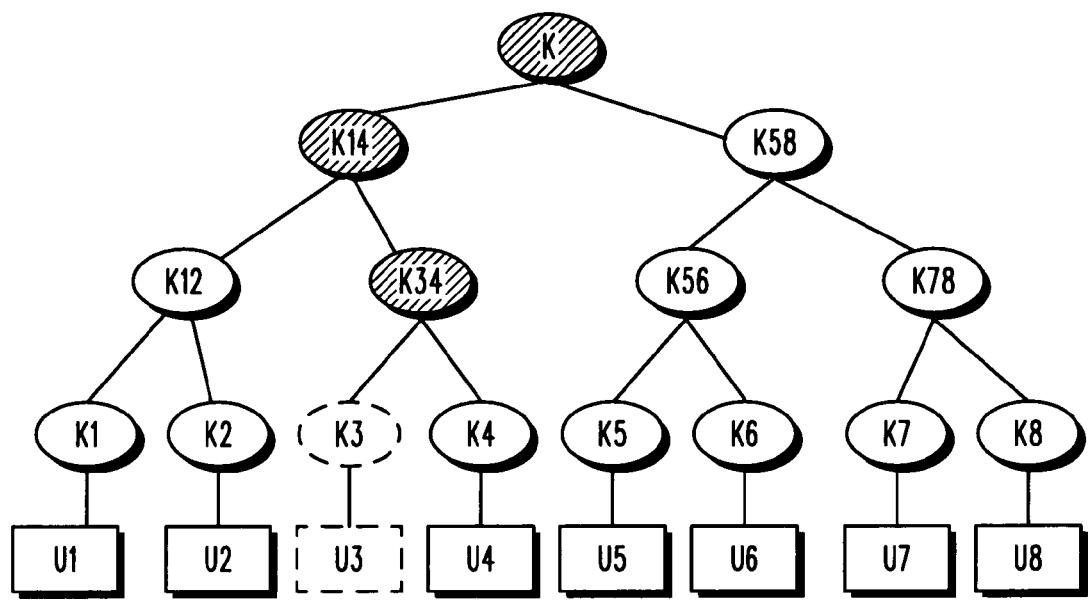
FIG. 4 illustrates key updating upon a member of a communications group leaving the group, in accordance with an embodiment of the present invention.

Turning now to FIG. 3, a flow diagram of a more detailed method for key management in accordance with an embodiment of the present invention is shown and generally indicated. In this embodiment, the communication group comprises a multicast group of members that use at least a portion of the nodes attached to a network. Moreover, the key set generated and maintained by each GKU comprises a hierarchical binary key tree. In one implementation, each hierarchical binary key tree is structured as illustrated in FIG. 4 assuming that there are eight users (i.e., U1-U8) in the multicast group. Within this structure, there is a key path from each user to a root key in the key tree.

More specifically, the root of the tree, e.g., K, is typically a Traffic Encryption Key (TEK, i.e., the Group Key). The nodes of the tree typically hold Key Encryption Keys (KEKs), e.g., K1, K2, K3, K4, K5, K6, K7, K8, K12, K34, K56, K78, K14 and K58. The leaves of the tree correspond to the group members (U1-U8), and each member keeps logN KEKs that are KEKs in the path from the leaf node to the root, where N is the number of the group members. In this example of eight group members, each group member keeps log 8 or 4 keys generated by each GKU in the key management system. The keys for each member to keep are delivered to each member's node upon the members joining and authenticating to the group.

Returning to the method illustrated in FIG. 3 that may be performed in a primary and at least one secondary GKU, in this particular embodiment the primary and one secondary GKU. Each GKU generates (300) a hierarchical binary key tree having a key path corresponding to each member node (user) in a group of nodes (users), such as a multicast group. Each GKU may use a suitable algorithm for generating its key tree. Each GKU then encrypts (310) each node's key path using the PRE_K. Each GKU forwards (320) the corresponding key paths the respective nodes, via one or more GKD, upon the node being authenticated by the GKD. In this implementation, each membership change in the multicast group, e.g., the joining or leaving of a member, triggers an update of all KEKs from the member leaf (that joined or left) to the root because the keys in the key path held by this member are considered compromised.

Turning now to FIG. 4, key updating upon a member of a communications group leaving the group, in accordance with an embodiment of the present invention is shown and generally indicated. In this example, user U3 leaves the multicast group. Thus, it can be readily seen that all keys in the path from U3 to the root K, i.e., K34, K14 and K, should be updated or changed. It should be readily realized by those of ordinary skill in the art that K3 need not be changed since K3 was only used by U3, and U3 has left the group.

Figure 5:
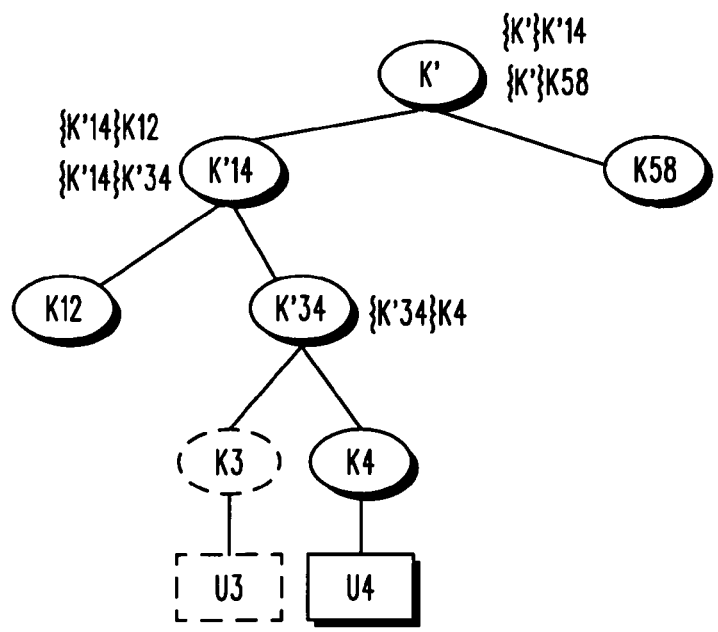
FIG. 5 further illustrates key updating upon the member of the communications group leaving the group, in accordance with an embodiment of the present invention.

Turning now to FIG. 5, key updating upon the member U3 of the communications group leaving the group, in accordance with an embodiment of the present invention is shown and generally indicated. Normally both the primary and secondary GKU would perform these key updates, or re-keying (step 330 of FIG. 3). FIG. 5 illustrates the necessary encryptions (step 340 of FIG. 3) to change K34, K14 and K. A new K'34 is randomly generated and encrypted with K4 such that U4 can decrypt the new K'34. A new K'14 is randomly generated and encrypted with K12 and K'34 such that all members in the K12 sub-tree and U4 will be able to decrypt the new K'14. Finally, a new root TEK K' is randomly generated and encrypted with K'14 and K58 respectively. Ideally, all the encrypted keys are combined in a single message and multicast (step 350 of FIG. 3) to the group, e.g. Enc[K'34]_K4+ Enc[K'14]_K12+Enc[K'14]_K'34+Enc[K']_K'14+Enc[K']_ K58, where Enc[ ] denotes encryption using the key indicated in the brackets. It should be readily appreciated by skilled artisans that each GKU would typically generate and transmit its own separate multicast message containing its key updates to the remaining group members. Only the legitimate group members with the associated children keys will be able to decipher the new keys. Since each new key is encrypted with both of its children, the message size is generally on the order of logN (e.g., 2 logN) where N is the number of the group members.

A benefit of using a hierarchical binary key tree scheme is scalability. If one of the nodes leaves the group, instead of having to change the entire set of keys in use, only the key path for the node that left the group would need to be changed, i.e., no more than logN keys would need to be changed where N is the number of group members. This minimizes any potential delay in the group communications.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, in another implementation of the various embodiments of the present invention, each GKU may be configured for generating a key table instead of a key tree, and the GKD may selectively distribute the keys in the key table to each authorized node. Any suitable key table scheme may be used such as a flat key table scheme as is well known in the art. Key updates could be performed by the GKU in a manner similar to that described above. Thus, it should be understood that the invention is not limited by the foregoing description, but embraces all such alterations, modifications and variations in accordance with the spirit and scope of the appended claims.

What is claimed is:

1. A system for key management for a plurality of nodes comprising:
   a first key generation device for generating a first set of secret keys for encrypting information for secure communication between the plurality of nodes;
   a second key generation device for generating a second set of secret keys that is different from the first set of secret keys for encrypting information for secure communication between the plurality of nodes; and
   key distribution apparatus coupled to the first and second key generation devices for authenticating the plurality of nodes and selectively distributing the first and second sets of secret keys to the plurality of authenticated nodes, wherein the first set of secret keys and the second set of secret keys are simultaneously stored in each of the plurality of nodes to enable fault tolerance in the system.

2. A system according to claim 1, wherein at least one of the first key generation device and the second key generation device is co-located with the key distribution apparatus.

3. A system according to claim 1, wherein:
   the plurality of nodes comprises N number of nodes;
   the first set of secret keys comprises a first hierarchical binary key tree for providing logN number of the first set of secret keys to each of the N number of nodes; and
   the second set of secret keys comprises a second hierarchical binary key tree for providing logN number of the first set of secret keys to each of the N number of nodes.

4. A system according to claim 1, wherein the first set of secret keys comprises a first key table and the second set of secret keys comprises a second key table.

5. A system according to claim 1, wherein the first key generation device is a primary key generation device, and the second key generation device is a secondary key generation device, and the second set of secret keys is used for the secure communication upon the first key generation device becoming inoperable.

6. A system according to claim 1, wherein the key distribution apparatus comprises at least two key distribution devices.

7. A system according to claim 6, wherein the first and second sets of secret keys are each encrypted such that when at least one of the key distribution devices becomes inoperable the remaining key distribution devices selectively distribute the first and second sets of encrypted secret keys to the plurality of nodes.

8. A method for key management for a plurality of nodes comprising the steps of:
   generating a first set of secret keys in a first key generation device and a second set of secret keys in a second key generation device for distribution to the plurality of nodes, wherein the second set of secret keys is different from the first set of secret keys, wherein the first and second sets of secret keys are for encrypting information sent between the plurality of nodes;
   encrypting the first and second sets of secret keys; and
   forwarding, via key distribution apparatus, at least one encrypted key from each of the first and second sets of keys to each node in the plurality of nodes upon the node being authenticated by the key distribution apparatus, wherein at least one key from the first set of secret keys and at least one key from the second set of secret keys are simultaneously stored in each of the plurality of nodes to enable fault tolerance in the system.

9. A method according to claim 8, wherein the plurality of nodes comprises N number of nodes, and wherein each of the first and second set of secret keys comprises a hierarchical binary tree having a key path corresponding to each node in the plurality of nodes, and each node is forwarded a corresponding encrypted key path comprising LogN secret keys from each of the first and second sets upon the node being authenticated.

10. A method according to claim 8, wherein the first set of secret keys is generated by a primary key generation device, and the first set of secret keys is used for secure communication between the plurality of nodes.

11. A method according to claim 10, wherein the second set of secret keys is generated by a secondary key generation device, and the second set of secret keys is used for secure communication between the plurality of nodes upon the primary key generation device becoming inoperable.

12. A method according to claim 8, wherein at least a portion of the plurality of nodes comprises a multicast group and at least one node leaves the multicast group, the method further comprising the steps of:
   changing at least one key in each of the first and second sets of secret keys;
   encrypting the changed keys; and
   forwarding the encrypted changed keys to at least one remaining node in the multicast group.

13. A method according to claim 12, wherein the encrypted changed keys are forwarded in at least one multicast message to the remaining nodes in the multicast group.

14. A method according to claim 12, wherein the changed keys are a first and second key path corresponding to the at least one node that left the multicast group.

* * * * *